(12) United States Patent
Ikeda et al.

(10) Patent No.: US 10,604,829 B2
(45) Date of Patent: Mar. 31, 2020

(54) HIGH-STRENGTH PLATED STEEL SHEET HAVING EXCELLENT PLATING PROPERTIES, WORKABILITY, AND DELAYED FRACTURE RESISTANCE, AND METHOD FOR PRODUCING SAME

(71) Applicant: Kobe Steel, Ltd., Kobe-shi (JP)

(72) Inventors: Muneaki Ikeda, Kakogawa (JP); Michiharu Nakaya, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 218 days.

(21) Appl. No.: 15/541,901

(22) PCT Filed: Jan. 5, 2016

(86) PCT No.: PCT/JP2016/050066
§ 371 (c)(1),
(2) Date: Jul. 6, 2017

(87) PCT Pub. No.: WO2016/111271
PCT Pub. Date: Jul. 14, 2016

(65) Prior Publication Data
US 2018/0010227 A1    Jan. 11, 2018

(30) Foreign Application Priority Data
Jan. 9, 2015    (JP) .................................. 2015-003469

(51) Int. Cl.
*C23C 2/40*    (2006.01)
*C23C 2/06*    (2006.01)
(Continued)

(52) U.S. Cl.
CPC .............. *C23C 2/40* (2013.01); *B32B 15/013* (2013.01); *B32B 15/04* (2013.01); *B32B 15/043* (2013.01);
(Continued)

(58) Field of Classification Search
CPC ..... B32B 15/013; B32B 15/04; B32B 15/043; B32B 15/18; C23C 2/00; C23C 2/06;
(Continued)

(56) References Cited

U.S. PATENT DOCUMENTS 9,109,275 B2    8/2015  Morimoto et al.
2010/0132849 A1*  6/2010  Takagi .................. C21D 6/005
                                                    148/533
(Continued)

FOREIGN PATENT DOCUMENTS

CN    103114257 A    5/2013
JP    2007-211279 A  8/2007
(Continued)

OTHER PUBLICATIONS

International Search Report dated Apr. 12, 2016 in PCT/JP2016/050066 filed Jan. 5, 2016.

*Primary Examiner* — Michael E. La Villa
(74) *Attorney, Agent, or Firm* — Oblon, McClelland, Maier & Neustadt, L.L.P.

(57) ABSTRACT

Disclosed herein is a high-strength plated steel sheet having a plated layer on the surface of a base steel sheet and containing predetermined steel components. The steel sheet includes, in the order from the interface of the base steel sheet and the plated layer towards the base steel sheet: a soft layer having a Vickers hardness that is 90% or less of the Vickers hardness at a portion t/4 of the base steel sheet, where t is a sheet thickness of the base steel sheet; and a hard layer consisting of a structure which is mainly composed of martensite and bainite and in which the average grain size of prior austenite is 20 μm or less. The average depth D of the soft layer is 20 μm or greater, and the average depth d of an internal oxide layer is 4 μm or greater and smaller than D.

6 Claims, 3 Drawing Sheets

(51) Int. Cl.
<table>
<tr><td>C23C 2/28</td><td>(2006.01)</td></tr>
<tr><td>C21D 8/02</td><td>(2006.01)</td></tr>
<tr><td>C21D 9/46</td><td>(2006.01)</td></tr>
<tr><td>C22C 38/00</td><td>(2006.01)</td></tr>
<tr><td>C22C 38/02</td><td>(2006.01)</td></tr>
<tr><td>C22C 38/04</td><td>(2006.01)</td></tr>
<tr><td>C22C 38/06</td><td>(2006.01)</td></tr>
<tr><td>C22C 38/60</td><td>(2006.01)</td></tr>
<tr><td>C23C 30/00</td><td>(2006.01)</td></tr>
<tr><td>B32B 15/18</td><td>(2006.01)</td></tr>
<tr><td>C23C 2/00</td><td>(2006.01)</td></tr>
<tr><td>B32B 15/04</td><td>(2006.01)</td></tr>
<tr><td>C23C 2/26</td><td>(2006.01)</td></tr>
<tr><td>C23C 2/36</td><td>(2006.01)</td></tr>
<tr><td>B32B 15/01</td><td>(2006.01)</td></tr>
<tr><td>C22C 38/14</td><td>(2006.01)</td></tr>
<tr><td>C22C 38/38</td><td>(2006.01)</td></tr>
<tr><td>C22C 38/12</td><td>(2006.01)</td></tr>
<tr><td>C22C 38/16</td><td>(2006.01)</td></tr>
<tr><td>C22C 38/08</td><td>(2006.01)</td></tr>
<tr><td>C22C 38/18</td><td>(2006.01)</td></tr>
<tr><td>C22C 38/20</td><td>(2006.01)</td></tr>
<tr><td>C22C 38/28</td><td>(2006.01)</td></tr>
<tr><td>C21D 6/00</td><td>(2006.01)</td></tr>
<tr><td>C23G 1/08</td><td>(2006.01)</td></tr>
</table>

(52) U.S. Cl.
CPC ............. *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0247* (2013.01); *C21D 8/0263* (2013.01); *C21D 8/0278* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/28* (2013.01); *C22C 38/38* (2013.01); *C22C 38/60* (2013.01); *C23C 2/00* (2013.01); *C23C 2/06* (2013.01); *C23C 2/26* (2013.01); *C23C 2/28* (2013.01); *C23C 2/36* (2013.01); *C23C 30/00* (2013.01); *C23C 30/005* (2013.01); *C23G 1/08* (2013.01); *C21D 2211/001* (2013.01); *C21D 2211/005* (2013.01); *Y10T 428/1259* (2015.01); *Y10T 428/1266* (2015.01); *Y10T 428/12583* (2015.01); *Y10T 428/12611* (2015.01); *Y10T 428/12618* (2015.01); *Y10T 428/12667* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/2495* (2015.01); *Y10T 428/24942* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
CPC .... C23C 2/26; C23C 2/28; C23C 2/36; C23C 2/40; C23C 30/00; C23C 30/005; C22C 38/00; C22C 38/38; C22C 38/16; C22C 38/14; C22C 38/12; C22C 38/08; C22C 38/06; C22C 38/02; C22C 38/005; C22C 38/002; C22C 38/001; C22C 38/04; C22C 38/18; C22C 38/20; C22C 38/28; C22C 38/60; C21D 2211/005; C21D 2211/001; C21D 9/46; C21D 8/0263; C21D 8/0205; C21D 8/0278; C21D 6/008; C21D 6/005; C21D 6/002; C21D 6/001; C21D 8/0247; C23G 1/08; Y10T 428/12583; Y10T 428/1259; Y10T 428/12611; Y10T 428/12618; Y10T 428/1266; Y10T 428/12667; Y10T 428/12951; Y10T 428/12958; Y10T 428/12965; Y10T 428/12972; Y10T 428/12993; Y10T 428/2495; Y10T 428/24967; Y10T 428/24975; Y10T 428/263; Y10T 428/264; Y10T 428/265; Y10T 428/24942
See application file for complete search history.

(56) References Cited

U.S. PATENT DOCUMENTS

<table>
<tr><td>2012/0152411 A1</td><td>6/2012</td><td>Morimoto et al.</td></tr>
<tr><td>2014/0212684 A1*</td><td>7/2014</td><td>Kawata ..................... C23C 2/28<br>428/632</td></tr>
<tr><td>2014/0227555 A1</td><td>8/2014</td><td>Kawata et al.</td></tr>
<tr><td>2015/0083278 A1</td><td>3/2015</td><td>Kawata et al.</td></tr>
<tr><td>2016/0160335 A1</td><td>6/2016</td><td>Ikeda</td></tr>
<tr><td>2017/0088914 A1</td><td>3/2017</td><td>Ikeda et al.</td></tr>
</table>

FOREIGN PATENT DOCUMENTS

<table>
<tr><td>JP</td><td>2011-231367 A</td><td>11/2011</td></tr>
<tr><td>JP</td><td>4943558 B2</td><td>5/2012</td></tr>
<tr><td>JP</td><td>2013-237924 A</td><td>11/2013</td></tr>
<tr><td>WO</td><td>WO 2011/025042 A1</td><td>3/2011</td></tr>
<tr><td>WO</td><td>WO 2013/047755 A1</td><td>4/2013</td></tr>
<tr><td>WO</td><td>WO 2015/005191 A1</td><td>1/2015</td></tr>
<tr><td>WO</td><td>WO 2015/146692 A1</td><td>10/2015</td></tr>
</table>

* cited by examiner

HIGH-STRENGTH PLATED STEEL SHEET HAVING EXCELLENT PLATING PROPERTIES, WORKABILITY, AND DELAYED FRACTURE RESISTANCE, AND METHOD FOR PRODUCING SAME

TECHNICAL FIELD

The present invention relates to a high-strength plated steel sheet having a tensile strength of 980 MPa or higher and having excellent platability, excellent formability in terms of both bendability and hole expandability, and excellent delayed fracture resistance, and also relates to a method for producing the steel sheet. The term plated steel sheet of the present invention denotes both of a hot-dip galvanized steel sheet and a hot-dip galvannealed steel sheet.

BACKGROUND ART

Hot-dip galvanized steel sheets and hot-dip galvannealed steel sheets that are widely used in the fields of automobiles, transport aircrafts and the like, are required to have, in addition to high strength, also excellent formability in terms of bendability and hole expandability (stretch flangeability), and to exhibit moreover excellent delayed fracture resistance. Such steel sheets are further required to have excellent impact absorption properties.

Adding a substantial amount of strengthening elements such as Si or Mn into steel is effective in order to secure high strength and formability. However, Si and Mn are readily oxidizable elements, and hot-dip galvanizing wettability is significantly impaired by an oxide film, having Si oxides, Mn oxides and complex oxides of Si and Mn, that is formed on the surface. This poor wettability gives rise to problems such as bare spots and the like.

Various technologies have therefore been proposed with a view to enhancing the formability and so forth of plated steel sheets that contain large amounts of Si and/or Mn.

For instance, Patent Literature 1 discloses a hot-dip galvanized steel sheet having a tensile strength of 590 MPa or higher and being excellent in bendability and corrosion resistance in worked portions. In further detail, Patent Literature 1 discloses the feature of significantly speeding up the growth of a decarburized layer with respect to the growth of an internal oxide layer that is formed from the interface of the steel sheet and a galvanized layer towards the steel sheet, so as to enable suppression of bending cracks and damage to a galvanized coating that are caused by the internal oxide layer. Further, Patent Literature 1 discloses a surface-near structure in which the thickness of the internal oxide layer in a ferrite region formed by decarburization is controlled so as to be thin.

Further, Patent Literature 2 discloses a hot-dip galvanized steel sheet excellent in fatigue durability, resistance to hydrogen embrittlement (synonymous with delayed fracture resistance) and bendability, the steel sheet having a tensile strength of 770 MPa or higher. In further detail, a steel sheet portion in Patent Literature 2 is configured to have a soft layer directly in contact with the interface with a galvanized layer, and a soft layer in which ferrite is set to be the structure of highest area ratio. Further, Patent Literature 2 discloses a hot-dip galvanized steel sheet in which a thickness D of the soft layer, and a depth d, from a galvanized layer/base iron interface, of an oxide that contains one or more from among Si and Mn and that is present in a surface layer of the steel sheet, satisfy $d/4 \leq D \leq 2d$.

CITATION LIST

Patent Literatures

Patent Literature 1: Japanese Unexamined Patent Publication No. 2011-231367
Patent Literature 2: Japanese Patent No. 4943558

SUMMARY OF INVENTION

Problems to be Solved by the Invention

As described above, various technologies have been proposed for enhancing the formability and so forth of plated steel sheets that contain large amounts of Si and Mn. However, it would be desirable to provide a technology that combines all of various characteristics demanded in a plated steel sheet, namely high strength of 980 MPa or higher coupled with platability and formability in terms of bendability and hole expandability, as well as delayed fracture resistance, and wherein the steel sheet further has excellent impact absorption properties.

In the light of the above issues, it is an object of the present invention to provide a hot-dip galvanized steel sheet and a hot-dip galvannealed steel sheet of 980 MPa or higher, the steel sheet being excellent in platability, in formability in terms of bendability and hole expandability, in delayed fracture resistance, and further in impact absorption properties, as well as a method for producing the steel sheet.

The gist of a high-strength plated steel sheet according to the present invention having a tensile strength of 980 MPa or higher and attaining the above goal, is a high-strength plated steel sheet having a hot-dip galvanized layer or a hot-dip galvannealed layer on a surface of a base steel sheet, wherein (1) the base steel sheet contains, in mass %, C: 0.05 to 0.25%; Si: 0.5 to 2.5%; Mn: 2.0 to 4%; P: more than 0% to 0.1% or less; S: more than 0% to 0.05% or less; Al: 0.01 to 0.1%; and N: more than 0% to 0.01% or less, the balance being iron and inevitable impurities; (2) the high-strength plated steel sheet sequentially has, from an interface of the base steel sheet and the hot-dip galvanized layer or galvannealed layer, towards the base steel sheet: an internal oxide layer containing at least one oxide selected from the group consisting of Si and Mn; a soft layer including the internal oxide layer and having a Vickers hardness of 90% or less of a Vickers hardness at a portion t/4 of the base steel sheet, where t is a sheet thickness of the base steel sheet; and a hard layer consisting of a structure which is mainly composed of martensite and bainite and in which the average grain size of prior austenite is 20 µm or less, wherein the high-strength plated steel sheet satisfies: an average depth D of the soft layer being 20 µm or greater; and an average depth d of the internal oxide layer being 4 µm or greater and smaller than the D.

In a preferred embodiment of the present invention, the base steel sheet further contains, in mass %, at least one of (a) to (c) below: (a) at least one selected from the group consisting of Cr: more than 0% to 1% or less, Mo: more than 0% to 1% or less and B: more than 0% to 0.01% or less; (b) at least one selected from the group consisting of Ti: more than 0% to 0.2% or less, Nb: more than 0% to 0.2% or less and V: more than 0% to 0.2% or less; and (c) at least one selected from the group consisting of Cu: more than 0% to 1% or less and Ni: more than 0% to 1% or less.

In a preferred embodiment of the present invention, the average depth d of the internal oxide layer and the average depth D of the soft layer satisfy the relationship D>2d.

A production method of the present invention that allows attaining the above goal is a method for producing any of the high-strength plated steel sheets set forth above, the method comprising, in order: a hot rolling step of coiling, at a temperature of 600° C. or higher, a hot-rolled steel sheet having the aforementioned steel components; a step of pickling and cold rolling such that there remain the internal oxide layer with the average depth d of 4 μm or more; a step of oxidizing the steel sheet at an air ratio in a range of 0.9 to 1.4 in an oxidation zone; a step of soaking the steel sheet within a range of $Ac_3$ point to $Ac_3$ point+100° C., in a reduction zone; and a step of, after the soaking, cooling at an average cooling rate of 5° C./sec or higher over a range down to a cooling stop temperature, wherein the steel sheet is heated at an average rate of 3° C./sec or higher from 500° C. to the $Ac_3$ point.

Another production method of the present invention that allows attaining the above goal is a method for producing any of the high-strength plated steel sheets set forth above, the method having, in order: a hot rolling step of coiling, at a temperature of 500° C. or higher, a hot-rolled steel sheet having the aforementioned steel components; a step of keeping the steel sheet in a temperature region of 500° C. or higher for 80 minutes or longer; a step of pickling and cold rolling such that there remain the internal oxide layer with the average depth d of 4 μm or more; a step of oxidizing the steel sheet at an air ratio in the range of 0.9 to 1.4, in an oxidation zone; a step of soaking the steel sheet within a range of $Ac_3$ point to $Ac_3$ point+100° C., in a reduction zone; a step of, after the soaking, cooling at an average cooling rate of 5° C./sec or higher over a range down to a cooling stop temperature, wherein the steel sheet is heated at an average rate of 3° C./sec or higher from 500° C. to the $Ac_3$ point.

The plated steel sheet of the present invention is configured to have, sequentially from an interface of a plated layer and a base steel sheet towards the base steel sheet: an internal oxide layer having at least one oxide selected from the group consisting of Si and Mn; a soft layer including the region of the internal oxide layer; and a hard layer which is other than the soft layer and mainly composed of martensite and bainite and in which the average grain size of prior austenite is 20 μm or less. In particular, the internal oxide layer can be utilized as a hydrogen trap site by controlling the average depth d of the internal oxide layer to be 4 μm or greater. Accordingly, it becomes possible to suppress hydrogen embrittlement effectively, and to obtain a high-strength plated steel sheet having a tensile strength of 980 MPa or higher and being excellent in formability in terms of bendability and hole expandability as well as in delayed fracture resistance. Preferably, the relationship between the average depth d of the internal oxide layer and the average depth D of the soft layer that includes the region of the internal oxide layer is controlled properly, whereby bendability and delayed fracture resistance in particular are further enhanced.

DESCRIPTION OF EMBODIMENTS

The inventors conducted repetitive researches focusing in particular on a layer configuration from the interface of a plated layer and a base steel sheet towards the base steel sheet, with a view to providing a high-strength plated steel sheet from a base steel sheet that contains a large amount of Si and Mn, the plated steel sheet having a high strength of 980 MPa or higher and being excellent in all of platability, formability, delayed fracture resistance, and impact absorption properties. As a result, the inventors found that (a) by prescribing the layer configuration to be, from the interface of the plated layer and the base steel sheet towards the base steel sheet: a soft layer including an internal oxide layer having at least one oxide selected from the group consisting of Si and Mn, and a hard layer which is other than the soft layer and mainly composed of martensite and bainite and in which the average grain size of prior austenite is 20 μm or less, as illustrated in the schematic diagram of FIG. 1 described below, and (b) by controlling the average depth d of the internal oxide layer to be 4 μm or greater, the internal oxide layer can function as a hydrogen trap site, and it becomes possible to suppress hydrogen embrittlement effectively, thereby achieving the intended purpose, and that (c) preferably by properly controlling the relationship between the average depth d of the internal oxide layer and the average depth D of the soft layer that includes a region of the internal oxide layer, bendability and delayed fracture resistance in particular are further enhanced, thereby completing the present invention.

In the present specification, the term plated steel sheet denotes both of a hot-dip galvanized steel sheet and a hot-dip galvannealed steel sheet. Further, in the present specification, the term base steel sheet denotes a steel sheet before formation of a hot-dip galvanized layer and a hot-dip galvannealed layer, and is distinguished from the above plated steel sheet.

In the present specification, the term high strength denotes a tensile strength of 980 MPa or higher.

In the present specification, the feature of having excellent formability signifies being excellent both in bendability and in hole expandability. In further detail, a steel sheet satisfying the acceptance criteria in the Examples described below upon measurement of the foregoing characteristics, in accordance with the methods described in the Examples, will be referred to as a steel sheet having "excellent formability".

The plated steel sheet of the present invention, as described above, has a hot-dip galvanized layer or a hot-dip galvannealed layer (which may hereafter be referred to simply as plated layer) on the surface of a base steel sheet. The characterizing feature of the present invention lies in having a layer configuration (A) to (C) shown below, in this order, from the interface of the base steel sheet and the plated layer towards the base steel sheet:

(A) an internal oxide layer containing at least one oxide selected from the group consisting of Si and Mn, where an average depth d of the internal oxide layer is 4 μm or greater, and is smaller than an average depth D of the soft layer set forth in (B) below.

(B) a soft layer including the above internal oxide layer and satisfying having a Vickers hardness of 90% or less of the Vickers hardness at a portion t/4 of the base steel sheet, where t is the sheet thickness of the base steel sheet, and an average depth D of the soft layer is 20 µm or greater.

(C) a hard layer consisting of a structure which is mainly composed of martensite and bainite and in which the average grain size of prior austenite is 20 µm or less, wherein the feature "mainly composed of" indicates that a sum area ratio of bainite and martensite is 80 area % or more and that an area ratio of ferrite is 0 area % or more and is 5 area % or less, in a measurement of structure fraction determined by a method described in the Examples below.

Figure 1:
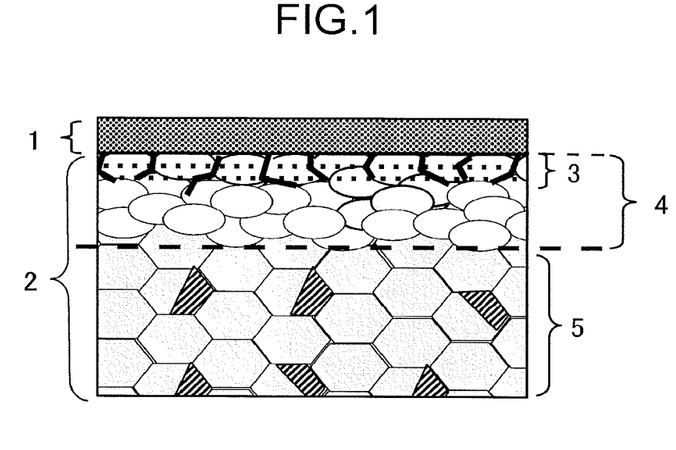
FIG. 1 is a diagram for explaining schematically a layer configuration of a plated steel sheet of the present invention, from an interface of a plated layer and a base steel sheet towards the base steel sheet.

Hereafter, the layer configuration (A) to (C), being the characterizing feature of the present invention, will be successively described in detail with reference to FIG. 1. As illustrated in FIG. 1, the layer configuration of the base steel sheet 2 in the plated steel sheet of the present invention has the (B) soft layer 4 and the (C) hard layer 5 which is located further inside the base steel sheet 2 than the soft layer 4, as viewed from the interface of the plated layer 1 and the base steel sheet 2 towards the base steel sheet 2. The (B) soft layer 4 includes the (A) internal oxide layer 3. The soft layer 4 and the hard layer 5 are present contiguously.

(A) Internal Oxide Layer

First, a portion directly in contact with the interface of the plated layer 1 and the base steel sheet 2 has the internal oxide layer 3 having an average depth d of 4 µm or greater. The term average depth herein denotes an average depth from the interface, and a detailed measurement method of the average depth will be explained further on with reference to FIG. 2 in the Example section given below.

The internal oxide layer 3 consists of an oxide that includes at least one from among Si and Mn, and of a depletion layer of Si and Mn having little solid-solution Si and/or solid-solution Mn in the periphery as a result of the formation of the oxides of Si and Mn.

The most distinctive feature of present invention involves controlling the average depth d of the internal oxide layer 3 to a thickness of 4 µm or greater. By doing so, it becomes possible to exploit the internal oxide layer as a hydrogen trap site and to suppress hydrogen embrittlement, while enhancing bendability, hole expandability, and delayed fracture resistance.

During annealing (i.e. during an oxidation-reduction step in a below-described continuous hot-dip galvanizing line), a complex oxide film of Si and Mn readily forms on the base steel sheet surface, and platability is hampered in a base steel sheet having a large amount of readily oxidizable elements such as Si and Mn, as in the present invention. Therefore, countermeasure methods are known that involve annealing (reduction annealing) in an atmosphere containing hydrogen, after generation of a Fe oxide film through oxidation of the base steel sheet surface in an oxidizing atmosphere. A further method involves controlling the atmosphere inside a furnace, to thereby fix readily oxidizable elements in the interior of a base steel sheet surface layer, in the form of oxides, and reduce the amount of readily oxidizable elements being in solid solution in the base steel sheet surface layer, to prevent as a result formation of an oxide film of readily oxidizable elements on the base steel sheet surface.

However, results of studies by the inventors have revealed that, in the oxidation-reduction methods generally resorted to in order to plate a base steel sheet containing a large amount of Si and Mn, hydrogen in the hydrogen atmosphere during reduction intrudes into the base steel sheet, giving rise to an impairment of bendability and hole expandability due to hydrogen embrittlement; and that the use of at least one oxide selected from the group consisting of Si and Mn is effective in order to improve such impairment. In further detail, it has been found out that the above oxides prevent intrusion of hydrogen into the base steel sheet during reduction and are thus useful as hydrogen trap sites that allow improving bendability, hole expandability, and delayed fracture resistance, and that, in order to effectively elicit the above effect, it is essential to form the internal oxide layer thicker such that the average depth d of the internal oxide layer including the oxides is 4 µm or greater.

In the present invention, the upper limit of the average depth d of the internal oxide layer is at least smaller than the average depth D of the (B) soft layer described below. Preferably, the upper limit of d is 30 µm or smaller. That is because although prolonged keeping in a high-temperature region after hot-rolled coiling is required in order to thicken the internal oxide layer, the upper limit takes on roughly the above preferred value, due to productivity and equipment constraints. The above d is more preferably 18 µm or smaller, and yet more preferably 16 µm or smaller. The above d is preferably 6 µm or greater, more preferably 8 µm or greater and yet more preferably greater than 10 µm.

Further, in the present invention, preferably, the average depth d of the internal oxide layer is controlled in such a way so as to satisfy a relational expression D>2d in a relationship with the average depth D of the (B) soft layer described below. Bendability and delayed fracture resistance, particularly the bendability, are further enhanced as a result. In contrast, Patent Literature 2 described above discloses a hot-dip galvanized steel sheet that satisfies $d/4 \leq D \leq 2d$ for a presence depth d of an oxide and a thickness D of a soft layer that substantially correspond to the average depth d of the internal oxide layer and the average depth D of the soft layer described in the present invention, so that the directionality of control is completely different from that of the relational expression (D>2d) prescribed in the present invention. Patent Literature 2 discloses the feature of controlling the range of the presence depth d of an oxide while basically satisfying the relationship $d/4 \leq D \leq 2d$ described above, but does not involve at all the basic idea of controlling the average depth d of the internal oxide layer to a thickness of 4 µm or greater, as in the present invention. Needless to say, Patent Literature 2 fails to disclose the effect of the present invention that is elicited as a result, i.e. effective functioning as hydrogen trap sites and affording enhanced bendability, hole expandability, and delayed fracture resistance.

In order to control the average depth d of the internal oxide layer to be 4 µm or greater in the present invention, it is necessary to control to 4 µm or more the average depth of the internal oxide layer in the cold-rolled steel sheet before passing through a continuous hot-dip galvanizing line. The details are described below in the section relating to a production method. Specifically, the internal oxide layer after pickling and cold rolling goes on to become an internal oxide layer in a plated steel sheet that is obtained eventually after passage through a galvanizing/galvannealing line, as in the Examples described below.

(B) Soft Layer

As illustrated in FIG. 1, in the present invention, the soft layer 4 is a layer including a region of the above (A) internal oxide layer 3, and satisfying having a Vickers hardness of 90% or less of the Vickers hardness at a portion t/4 of the base steel sheet 2. The detailed measurement method of the Vickers hardness is explained in the below-described Example section.

The soft layer has a soft structure of lower Vickers hardness than that of the hard layer (C) described below, exhibits excellent deformability, and accordingly, affords in particular enhanced bendability. That is, although the surface layer portion of the base steel sheet is an origin of cracks during bending work, bendability is particularly improved through formation of a predetermined soft layer on the base steel sheet surface layer, as in the present invention. Moreover, forming the soft layer allows preventing the oxide inside (A) from becoming an origin of cracks during bending work, and to enjoy only the benefits of the oxide acting as a hydrogen trap site, as described above. As a result, not only bendability but also delayed fracture resistance is further enhanced.

The average depth D of the soft layer is set to be 20 μm or greater in order to effectively elicit the effect derived from forming such a soft layer. The above D is preferably 22 μm or greater, and more preferably 24 μm or greater. When the average depth D of the soft layer is excessively large, on the other hand, the strength of the plated steel sheet itself drops, and accordingly, it is preferable to set the upper limit of the average depth D to be 100 μm or smaller. The above D is more preferably 60 μm or smaller.

(C) Hard Layer

In the present invention, as illustrated in FIG. 1, the hard layer is formed on the base steel sheet 2 side of the (B) soft layer 4 and consists of a fine structure which is mainly composed of martensite and bainite and in which the average grain size of prior austenite is 20 μm or less. The martensite of the hard layer 5 may be tempered. Herein, the feature "mainly composed of" indicates that a sum area ratio of bainite and martensite relative to the total structure is 80 area % or more and that an area ratio of ferrite relative to the total structure is 0 area % or more and is 5 arca % or less, in a measurement of structure fraction determined by the method described in the Examples below. The greater the sum area ratio of bainite and martensite of the hard layer is, the better it is. Preferably, the sum area ratio of bainite and martensite is 93 area % or more. On the other hand, the smaller the area ratio of ferrite is, the better it is. The area ratio of ferrite is preferably 5 area % or less, more preferably 3 area % or less and most preferably 0 area %.

As a result of researches conducted by the present inventors, it has been found out that formability in terms of bendability and hole expandability as well as delayed fracture resistance are improved when the grain size of prior austenite is reduced. This seems to be due to the following reason. Although cracks become liable to be generated by stress concentration when prior austenite grains become coarse, the stress concentration can be alleviated to suppress generation of cracks by reducing the size of prior austenite.

In order to ensure formability in terms of bendability and hole expandability as well as delayed fracture resistance in this manner, it is effective to reduce the size of prior austenite. From such a viewpoint, the average grain size of prior austenite must be set to be 20 μm or smaller, preferably 18 μm or smaller, and more preferably 16 μm or smaller. The lower limit of the average grain size of prior austenite is not particularly limited from the above viewpoint; however, the lower limit may be about 3 μm in consideration of production capability and productivity on an actual operation line.

Besides the above-described structure, the hard layer may include structures, for instance residual austenite (γ), pearlite, or the like, that may be unavoidably mixed in during production, in amounts that do not impair the effect of the present invention. Such a structure occupies 15 area % at the most, and the smaller the better. Such structures are notated in the Table 3 below as "Other".

Bendability and hole expandability are improved through formation of the hard layer. That is, bending cracks and/or cracks that arise during hole expansion occur generally as a result of stress concentration at the interface of a soft phase, for instance ferrite; and a hard phase, for instance martensite and bainite. Hence, the hardness difference between the soft phase and the hard phase must be reduced in order to suppress the above cracks. In the present invention, therefore, the structure inside the base steel sheet is prescribed to yield a hard layer mainly composed of bainite and martensite, by curtailing the ratio of soft ferrite to be 5 area % at the most. Furthermore, the yield ratio (YR) is enhanced, and also the impact absorption properties are improved, because the ratio of ferrite is suppressed in the hard layer.

Here, it is sufficient that the hard layer in the present invention mainly contains bainite and martensite as described above, and the ratio of each of bainite and martensite is not limited at all. This is because, in the present invention, the above effect produced by formation of the hard layer is elicited as long as the aforementioned requirements are satisfied. Accordingly, the hard layer can satisfy any of the relationships of bainite>martensite, bainite=martensite, and bainite<martensite, as long as the above requirements are satisfied. Furthermore, a mode in which the hard layer is composed of bainite alone and martensite is not contained at all; and a mode in which, conversely, the hard layer is composed of martensite alone and bainite is not contained at all, are both comprised within the scope of the present invention. From the above viewpoint, bainite and martensite were observed without distinguishing the two from each other in the Examples given below, and only a sum area was measured. The result thereof is shown in Table 3.

The layer configuration from the interface of the plated layer and the base steel sheet towards the base steel sheet, which is the most significant characterizing feature of the present invention, has been thus explained above.

The steel components that are used in the present invention will be explained next.

The plated steel sheet of the present invention contains C: 0.05 to 0.25%, Si: 0.5 to 2.5%, Mn: 2.0 to 4%, P: more than 0% to 0.1% or less, S: more than 0% to 0.05% or less, Al: 0.01 to 0.1% and N: more than 0% to 0.01% or less, and the balance is iron and inevitable impurities.

C: 0.05 to 0.25%

C has the effect of enhancing hardenability and of hardening martensite, by virtue of which C is an important element in terms of strengthening steel. In order to effectively bring out that effect, the lower limit of the amount of C is set to be 0.05% or more. A preferred lower limit of the amount of C is 0.08% or more, more preferably 0.10% or more. When C is added in an excessive amount, however, the hardness difference between the soft phase and the hard phase increases to degrade formability and delayed fracture resistance, so that the upper limit of the amount of C is set to be 0.25%. A preferred upper limit of the amount of C is 0.2% or less, more preferably 0.18% or less.

Si: 0.5 to 2.5%

Si is an effective element in terms of increasing the strength of steel and enhancing formability, through solid-solution strengthening. Further, Si has the effect of generating an internal oxide layer and suppressing hydrogen embrittlement. In order to effectively bring out that effect, the lower limit of the amount of Si is set to be 0.5% or more. A preferred lower limit of the amount of Si is 0.75% or more, more preferably 1% or more. However, Si is a ferrite-generating element, and when Si is added in an excessive amount, generation of ferrite cannot be suppressed, so that the hardness difference between the soft phase and the hard phase increases, and formability decreases. Further, platability as well is impaired, and hence the upper limit of the amount of Si is set to be 2.5%. A preferred upper limit of the amount of Si is 2% or less, more preferably 1.8% or less.

Mn: 2.0 to 4%

Herein, Mn is a hardenability-enhancing element that suppresses ferrite and bainite and contributes to increasing the strength through generation of martensite. In order to effectively bring out that effect, the lower limit of the amount of Mn is set to be 2.0% or more. A preferred lower limit of the amount of Mn is 2.3% or more, more preferably 2.5% or more. When Mn is added in an excessive amount, however, platability decreases, and segregation becomes conspicuous. A further concern is the resulting promotion in P grain boundary segregation. Accordingly, the upper limit of the amount of Mn is set to be 4%. A preferred upper limit of the amount of Mn is 3.5% or less.

P: more than 0% to 0.1% or less

As a solid-solution strengthening element, P is a useful element for strengthening steel. In order to effectively bring out that effect, the lower limit of the amount of P is set to exceed 0%. If the addition amount is excessive, however, not only formability but also weldability and toughness might become impaired, and accordingly, the upper limit of the addition amount is set to be 0.1% or less. The smaller the amount of P is, the better it is. The amount of P is preferably 0.03% or less, more preferably 0.015% or less.

S: more than 0% to 0.05% or less

Herein, S is an element of unavoidable presence and forms sulfides such as MnS, giving rise to origins of cracks and the concern of impaired formability. Accordingly, the upper limit of the amount of S is set to be 0.05% or less. The smaller the amount of S is, the better it is. The amount of S is preferably 0.01% or less, more preferably 0.008% or less.

Al: 0.01 to 0.1%

Herein, Al acts as a deoxidizing agent. Also, by bonding with N to form AlN thereby, Al has the effect of enhancing formability and delayed fracture resistance by making the grain size of austenite finer. In order to effectively bring out that effect, the lower limit of the amount of Al is set to be 0.01% or more. A preferred lower limit of the amount of Al is 0.02% or more, more preferably 0.03% or more. When Al is added in an excessive amount, however, inclusions of alumina and the like increase, and both formability and toughness are impaired as a result. Accordingly, the upper limit of the amount of Al is set to be 0.1%. A preferred upper limit of the amount of Al is 0.08% or less, more preferably 0.05% or less.

N: more than 0% to 0.01% or less

Herein, N is an element of unavoidable presence which, if excessively contained, impairs formability. Further, BN precipitates are formed when B (boron) is added to the steel, and the hardenability-enhancing effect of B is thus hampered. Accordingly, the content of N should be reduced as much as possible. Therefore, the upper limit of the amount of N is set to be 0.01% or less. A preferred upper limit of the amount of N is 0.008% or less, more preferably 0.005% or less.

The plated steel sheet of the present invention contains the above components, the balance being iron and inevitable impurities.

Further, the optional elements shown below can be incorporated in the present invention.

At least one element selected from the group consisting of Cr: more than 0% to 1% or less, Mo: more than 0% to 1% or less, and B: more than 0% to 0.01% or less These elements are effective elements in terms of enhancing the strength of the steel sheet. The foregoing elements can be incorporated singly or in combinations of two or more elements.

In further detail, Cr enhances hardenability and contributes to increasing strength. Further, Cr suppresses generation and growth of cementite, and contributes to improving bendability. In order to effectively bring out that effect, the lower limit of the amount of Cr is set to be 0.01% or more. However, platability decreases when Cr is added in an excessive amount. Further, Cr carbides are generated excessively, and formability is impaired. Accordingly, a preferred upper limit of the amount of Cr is set to be 1% or less, more preferably 0.7% or less and yet more preferably 0.4% or less.

Herein, Mo is effective in increasing strength, and accordingly, a preferred lower limit of the amount of Mo is set to be 0.01% or more. However, even when M is added in excess, the effect of Mo levels off while giving rise to an increase in costs. Accordingly, a preferred upper limit of the amount of Mo is set to be 1% or less, more preferably 0.5% or less and yet more preferably 0.3% or less.

As in the case of Mn, B is a hardenability-enhancing element that suppresses ferrite and bainite, and that generates martensite, contributing thus to enhancing strength. In order to effectively bring out that effect, the lower limit of the amount of B is set to be 0.0002% or more, more preferably 0.0010% or more. However, an excessive amount of B results in poorer hot formability, so that a preferred upper limit of the amount of B is set to be 0.01% or less, more preferably 0.0070% or less and yet more preferably 0.0050% or less.

At least one element selected from the group consisting of Ti: more than 0% to 0.2% or less, Nb: more than 0% to 0.2% or less and V: more than 0% to 0.2% or less These elements are effective elements in enhancing formability and delayed fracture resistance by making the structure finer. The foregoing elements can be added singly or in combinations of two or more elements.

In order to effectively bring out the effect of the elements, the lower limits of Ti, Nb and V are each set to 0.01% or more. However, as ferrite is generated to impair formability when the content of any one of these elements is excessive, a preferred upper limit of the amount of each element is set to be 0.2% or less, more preferably 0.15% or less, and yet more preferably 0.10% or less, for all of these elements.

At least one element selected from the group consisting of Cu: more than 0% to 1% or less and Ni: more than 0% to 1% or less Herein, Cu and Ni are effective elements in terms of increasing strength. The foregoing elements may be added singly or may be used in combination.

In order to effectively bring out the effect of the elements, the lower limits of Cu and Ni are each set to be 0.01% or more. However, as hot formability decreases when the content of any one of these elements is excessive, a preferred upper limit of the amount of each element is set to be 1% or less, more preferably 0.8% or less and yet more preferably 0.5% or less, for all of these elements.

The steel components of the present invention have been explained above.

Methods for producing the plated steel sheet of the present invention will be explained next. The production methods of the present invention include a first method that involves pickling, without temperature keeping, immediately after hot-rolled coiling, and a second method that involves pickling after temperature keeping following the hot-rolled coiling. The lower limit of the hot-rolled coiling temperature varies between the first method (without temperature keeping) and the second method (with temperature keeping), depending on the presence or absence of temperature keeping. However, other steps are identical in the methods. The details are as described below.

[First Production Method (without Temperature Keeping)]

The first production method according to the present invention can be divided roughly into: a hot rolling step; a pickling and cold rolling step; and an oxidation step, a reduction step, and a galvanizing/galvannealing step in a continuous hot-dip galvanizing line (CGL (Continuous Galvanizing Line)). A characterizing feature of the present invention is to include the following steps, in order: a hot rolling step of coiling a steel sheet that satisfies the above steel components at a temperature of 600° C. or higher, to obtain as a result a hot-rolled steel sheet having an internal oxide layer formed therein; a step of pickling and cold rolling such that there remain the internal oxide layer with the average depth d of 4 µm or more; a step of oxidizing the steel sheet at an air ratio in the range of 0.9 to 1.4, in an oxidation zone; a step of soaking the steel sheet within a range of $Ac_3$ point to $Ac_3$ point+100° C., in a reduction zone; and a step of, after the soaking, cooling the steel sheet at an average cooling rate of 5° C./sec or higher over a range down to a cooling stop temperature, wherein the steel sheet is heated at an average rate of 3° C./sec or higher from 500° C. to the $Ac_3$ point.

The steps will be explained next in succession.

Firstly, there is prepared a hot-rolled steel sheet that satisfies the above steel components. Hot rolling may be carried out according to an ordinary method. Preferably, for instance, the heating temperature is set to lie in the range of about 1150 to 1300° C. in order to prevent coarsening of austenite grains. Preferably, the finish rolling temperature is controlled to lie roughly in the range of 850 to 950° C.

In the present invention, it is important to control the coiling temperature after hot rolling to be 600° C. or higher. As a result, an internal oxide layer is formed on the base steel sheet surface and a soft layer as well is formed through decarburization; hence, it becomes possible to obtain a desired internal oxide layer and a desired soft layer in the steel sheet after galvanizing/galvannealing. The internal oxide layer and the soft layer are not sufficiently generated in a case where the coiling temperature is lower than 600° C. Further, strength of the hot-rolled steel sheet increases, and cold ductility drops. A preferred coiling temperature is herein 620° C. or higher, and more preferably 640° C. or higher. When the coiling temperature is excessively high, however, black skin scale grows excessively and cannot be dissolved by pickling, so that the upper limit is preferably set to be 750° C. or lower.

Next, the hot-rolled steel sheet thus obtained is subjected to pickling and cold rolling in such a manner that there remain the internal oxide layer with the average depth d of 4 µm or more. As a result, there remains not only the internal oxide layer but also the soft layer, and in consequence, also the desired soft layer can be readily generated after galvanizing/galvannealing. Controlling the thickness of an internal oxide layer through control of pickling conditions is a known feature. Specifically, the temperature and time of pickling may be properly controlled in such a manner that the desired thickness of the internal oxide layer can be ensured in accordance with, for instance, the type, concentration and so forth of the pickling solution that is used.

For instance, a mineral acid such as hydrochloric acid, sulfuric acid, nitric acid, or the like can be used as the pickling solution.

Generally, a higher concentration and/or a higher temperature of the pickling solution, and longer pickling time, tend to produce a thinner internal oxide layer through dissolution. Conversely, removal of black skin scale layer through pickling becomes insufficient when the concentration or temperature of the pickling solution is low and the pickling time is short. Accordingly, it is recommended to control the concentration so as to lie in the range of about 3 to 20%, the temperature in the range of 60 to 90° C., and the time in the range of about 35 to 200 seconds, when using for instance hydrochloric acid.

The number of pickling baths is not particularly limited, and a plurality of pickling baths may be used herein. For instance, a pickling suppressant, i.e. inhibitor such as an amine, or a pickling promoter or the like may be added to the pickling solution.

After pickling, cold rolling is performed in such a manner that there remain the internal oxide layer with the average depth d of 4 µm or more. Preferably, the cold rolling conditions are controlled in such a manner that a cold rolling ratio lies in the range of about 20 to 70%.

Oxidation and reduction are performed next.

In detailed terms, firstly oxidation is carried out at an air ratio in the range of 0.9 to 1.4, in an oxidation zone. The term air ratio denotes herein a ratio of the amount of air actually supplied with respect to the amount of air stoichiometrically necessary in order to completely burn off a combustion gas that is supplied. An air ratio higher than 1 entails an excess of oxygen, while an air ratio lower than 1 entails a shortage of oxygen. In the examples described below, CO gas is used as the combustion gas.

Decarburization is promoted through oxidation in an atmosphere having an air ratio lying in the above range, whereby the desired soft layer is formed, and bendability is improved. Further, it becomes possible to generate a Fe oxide film on the surface and to suppress generation of a complex oxide film or the like that is detrimental to platability. When the air ratio is lower than 0.9, decarburization is insufficient, and a sufficient soft layer is not formed, so that bendability is impaired as a result. Further, generation of the Fe oxide film becomes insufficient, and generation of for instance the above complex oxide film cannot be suppressed, so that platability is impaired as a result. The air ratio has to be controlled to be 0.9 or higher, and is preferably controlled to be 1.0 or higher. When, on the other hand, the air ratio is so high as to exceed 1.4, the Fe oxide film is generated excessively, and cannot be sufficiently reduced in a subsequent reduction furnace, which hinders platability. The air ratio has to be controlled to be 1.4 or lower, and is preferably controlled to be 1.2 or lower.

In the oxidation zone, it is particularly important to control the air ratio. Ordinarily used methods can be resorted to herein as regards other conditions. For instance, a preferred lower limit of the oxidation temperature is 500° C. or higher, more preferably 750° C. or higher. The upper limit of the oxidation temperature is 900° C. or lower, more preferably 850° C. or lower.

Next, the oxide film is reduced in a hydrogen atmosphere, in a reduction zone. In order to obtain the desired hard layer through suppression of ferrite in the present invention, it is necessary to perform heating in an austenite single-phase region, so that a soaking treatment is performed in the range of $Ac_3$ point to $Ac_3$ point+100° C. Ferrite becomes excessive when the soaking temperature is lower than the $Ac_3$ point, while austenite becomes coarser to give a poorer formability when the soaking temperature exceeds $Ac_3$ point+100° C. A preferred soaking temperature lies in the range of not lower than $Ac_3$ point+15° C. and not higher than $Ac_3$ point+85° C.

Further, the steel sheet is heated at an average heating rate of 3° C./sec or higher in a temperature range of 500° C. to the $Ac_3$ point in order to obtain the hard layer in which the average grain size of prior austenite is 20 µm or less. When the average heating rate is lower than 3° C./sec, the average grain size of prior austenite becomes large, leading to decrease in formability in terms of bendability and hole expandability as well as in delayed fracture resistance. A preferable lower limit of the average heating rate is 4° C./sec or higher, more preferably 5° C./sec or higher. The upper limit of the average heating rate is not particularly limited, but is preferably 20° C./sec or lower, more preferably 18° C./sec or lower, in consideration of ease of control of the base steel sheet temperature and equipment cost.

In the present invention, it is important to heat the steel sheet at least in the aforementioned temperature range at an average heating rate of 3° C./sec or higher. The average heating rate in a temperature region lying outside of the above temperature range (temperature region of lower than 500° C. or temperature region exceeding the $Ac_3$ point) is not particularly limited, and may be an average heating rate of 3° C./sec or higher as in the above case or an average heating rate of lower than 3° C./sec. For instance, the aforementioned "temperature range of 500° C. to the $Ac_3$ point" preferably corresponds to the temperature region of the oxidation zone. However, after the steel sheet is heated at an average heating rate of 3° C./sec or higher in the oxidation zone, the steel sheet may be heated at an average heating rate of 3° C./sec or higher as it is in the reduction zone.

In the present invention, the $Ac_3$ point is calculated on the basis of Expression (i) below. The brackets [ ] in the expression denote content (mass %) of the elements. The expression is disclosed in "The Physical Metallurgy of Steels" (William C. Leslie, Published by Maruzen, page 273).

$$Ac_3(° C.)=910-203\times[C]^{1/2}-15.2\times[Ni]+44.7\times[Si]+104\times[V]+31.5\times[Mo]+13.1\times[W]-\{30\times[Mn]+11\times[Cr]+20\times[Cu]-700\times[P]=400\times[Al]-120\times[As]-400\times[Ti]\} \quad (i)$$

In the reduction furnace, it is particularly important to control the soaking temperature. Ordinarily used methods can be resorted to herein as regards other conditions. Preferably, for instance, the atmosphere of the reduction zone includes hydrogen and nitrogen, and the hydrogen concentration is controlled to lie in the range of about 5 to 25 vol %. Further, the dew point is preferably controlled to lie in the range of −30 to −60° C.

When the keeping time during the soaking treatment is short, reduction is insufficient to hamper platability, whereas when the keeping time is long, there arises a fear that prior austenite grains may become coarse. In consideration of these, a preferable keeping time is, for example, 10 seconds or longer and 100 seconds or shorter, more preferably 30 seconds or longer and 80 seconds or shorter, Cooling is performed next. The average cooling rate during cooling is controlled to be 5° C./sec or higher in such a manner that generation of ferrite can be suppressed. The average cooling rate is preferably 8° C./sec or higher, more preferably 10° C./sec or higher. The upper limit of the average cooling rate is not particularly limited, but is preferably controlled to be about 100° C./sec or lower, for instance in consideration of case of control of the base steel sheet temperature and equipment cost. A more preferred average cooling rate is 50° C./sec or lower, and yet more preferably 30° C./sec or lower.

The cooling stop temperature may be as low as within a temperature region such that ferrite is not generated, and the steel sheet is preferably cooled down, for instance, to 550° C. or lower. A preferable lower limit of the cooling stop temperature may be, for example, 450° C. or higher, more preferably 460° C. or higher, and yet more preferably 470° C. or higher.

In the present invention, it is important to control the average cooling rate at least until the cooling stop temperature, and a cooling method thereafter is not limited to the above-described one. For instance, when the steel sheet is to be heated to a plating bath temperature in performing hot-dip galvanization after cooling, the steel sheet may be cooled down to a temperature lower than the aforementioned preferable cooling stop temperature (for instance, see No. 11 of Table 1 given below). Or else, the steel sheet may be water-quenched after being cooled to a predetermined temperature.

Thereafter, hot-dip galvanizing is carried out in accordance with an ordinary method. The hot-dip galvanizing method is not particularly limited, and for instance a preferred lower limit of the plating bath temperature is 400° C. or higher, more preferably 440° C. or higher. Moreover, a preferred upper limit of the plating bath temperature is 500° C. or lower, more preferably 470° C. or lower. The composition of the plating bath is not particularly limited, and a known hot-dip galvanizing bath may be used herein. Further, cooling conditions after the hot-dip galvanizing are not particularly limited, and for instance the average cooling rate down to ordinary temperature is preferably controlled to be about 1° C./sec or higher, and more preferably 5° C./sec or higher. The upper limit of the average cooling rate is not particularly limited, but is preferably controlled to be about 50° C./sec or lower, for instance in consideration of ease of control of the base steel sheet temperature and equipment cost. The average cooling rate is preferably 40° C./sec or lower, and more preferably 30° C./sec or lower.

Furthermore, in accordance with the needs, an alloying process may be carried out in accordance with an ordinary method, whereby a hot-dip galvannealed steel sheet is obtained. The conditions of the alloying process as well are not particularly limited. Preferably, for instance, hot-dip galvanizing is carried out under the above conditions, and thereafter the temperature is kept in the range of about 500 to 600° C., in particular in the range of about 530 to 580° C., for about 5 to 30 seconds, in particular for about 10 to 25 seconds. Below the above ranges, alloying is insufficient. On the other hand, above the above ranges, alloying progresses excessively, and plating peeling may occur during press forming of the galvannealed steel sheet. Moreover, ferrite is generated readily in such a case. The alloying process may be carried out using for instance a heating furnace, open fire, or an infrared heating furnace. The heating means is not particularly limited, and may be for instance a conventional means such as gas heating or induction-heater heating, i.e. heating using a high-frequency induction heating device.

The alloying process is followed by cooling in accordance with an ordinary method, whereby a hot-dip galvannealed steel sheet is obtained. The average cooling rate down to ordinary temperature is preferably controlled to be about 1° C./sec or higher.

[Second Production Method (with Temperature Keeping)]

The second production method according to the present invention includes, in this order: a hot rolling step of coiling a hot-rolled steel sheet that satisfies the above steel components at a temperature of 500° C. or higher; a step of keeping the steel sheet in a temperature region of 500° C. or higher for 80 minutes or longer; a step of pickling and cold rolling the steel sheet such that there remain the internal oxide layer with the average depth d of 4 μm or more; a step of oxidizing the steel sheet at an air ratio in the range of 0.9 to 1.4, in an oxidation zone; a step of soaking the steel sheet within a range of $Ac_3$ point to $Ac_3$ point+100° C., in a reduction zone; a step of, after the soaking, cooling the steel sheet at an average cooling rate of 5° C./sec or higher over a range down to a cooling stop temperature, wherein the steel sheet is heated at an average rate of 3° C./sec or higher from 500° C. to the $Ac_3$ point. The second production method differs from the first production method described above only as regards two features, namely in that, in the second production method, the lower limit of the coiling temperature after hot rolling is set to be 500° C. or higher, and in that a temperature keeping step is provided after the hot-rolling step. Accordingly, only the above differences will be explained below. Steps identical to those of the first production method may be referenced to the first production method above.

The reason for providing the temperature keeping step as shown above is to enable prolonged keeping in a temperature region that allows for oxidation through temperature keeping, so as to expand the lower limit of the coiling temperature range within which there are obtained the desired internal oxide layer and soft layer. A further advantage herein is the increased homogeneity of the base steel sheet, resulting from a smaller temperature difference between the surface layer and the interior of the base steel sheet.

In the second production method, firstly the coiling temperature after hot rolling is controlled to be 500° C. or higher. As explained in detail further on, the lower limit of the coiling temperature can be set herein to be lower than that of the first production method described above, i.e. 600° C., since in the second production method there is provided the subsequent temperature keeping step. A preferred coiling temperature is 540° C. or higher, and more preferably 570° C. or higher. A preferred upper limit of the coiling temperature is identical to that of the first production method described above, and is preferably set to be 750° C. or lower.

Next, the hot-rolled steel sheet thus obtained is kept in a temperature region of 500° C. or higher for 80 minutes or longer. The desired internal oxide layer can be obtained as a result. Preferably, the temperature of the hot-rolled steel sheet is kept by placing the hot-rolled steel sheet for instance in a thermally-insulated apparatus, in such a way so as to effectively bring out the effect derived from temperature keeping. The above apparatus used in the present invention is not particularly limited, as long as the device is made up of a thermally insulating material. Preferred materials that can be used as the thermally insulating material include ceramic fibers and the like.

The temperature must be kept in a region of 500° C. or higher for 80 minutes or longer in order to elicit effectively the above effect. A preferred temperature is herein 540° C. or higher, and more preferably 560° C. or higher. A preferred time is 100 minutes or longer, more preferably 120 minutes or longer. Upper limits of the temperature and time are preferably controlled to be roughly 700° C. or lower and 500 minutes or shorter, for instance in consideration of pickling properties and productivity.

The first and second production methods according to the present invention have been explained above.

The plated steel sheet of the present invention obtained in accordance with the above production methods may be further subjected to various coating and coat-grounding treatments, for instance chemical conversion treatments such as a phosphate treatment, and organic coating treatments, for instance formation of an organic coating film such as a film laminate.

Coating materials that can be used in the above various coating schemes include known resins, for instance, epoxy resins, fluororesins, silicone acrylic resins, polyurethane resins, acrylic resins, polyester resins, phenol resins, alkyd resins, melamine resins, and the like. Taking corrosion resistance into account, preferred among the foregoing are epoxy resins, fluororesins, and silicon acrylic resins. A curing agent may be used together with the resins. The coating material may contain known additives, for instance coloring pigments, coupling agents, leveling agents, sensitizers, antioxidants, UV stabilizers, flame retardants, and the like.

The form of the coating material in the present invention is not particularly limited, and there can be used coating materials in any form, for instance, solvent-based coating materials, aqueous coating materials, aqueous dispersion type coating materials, powder coating materials, electrodeposition coating materials, and the like. Neither the coating method is particularly limited, and may involve dipping, roll coating, spraying, curtain flow coating, electrodeposition coating, or the like. The thickness of the coating layer such as a plated layer, an organic coating film, a chemical conversion coating, a coating film, or the like may be set as appropriate in accordance with the intended application.

The high-strength plated steel sheet of the present invention has ultra-high strength and boasts excellent formability (bendability and hole expandability) as well as excellent delayed fracture resistance, and can therefore be used in automotive strong parts, for instance, in crash parts such as front and rear side-members, crash boxes, and the like; pillars such as center pillar reinforcements and the like; as well as car body components such as roof rail reinforcements, side sills, floor members, kick sections, and the like.

The present application claims the right of priority based on Japanese Patent Application No. 2015-003469 filed on Jan. 9, 2015. The entire contents of the specification of Japanese Patent Application No. 2015-003469 filed on Jan. 9, 2015 are incorporated in the present application by reference.

EXAMPLES

Hereafter, the present invention will be explained more specifically by way of Examples; however, the invention is not limited by the following Examples and can be carried out while including additional modifications within a scope conforming to the gist disclosed heretofore and hereinafter, all such modifications being encompassed within the technical scope of the invention.

Slabs having the component composition given in Table 1, the balance being iron and inevitable impurities, were heated to 1250° C., and were hot-rolled down to 2.4 mm at a finish rolling temperature of 900° C., followed by coiling at the temperature given in Table 2.

Some of the examples, i.e. Nos. 25 to 27 and 32, were placed thereafter in a ceramic fiber heat-insulating apparatus, where the temperature was kept under the conditions given in Table 2. The keeping time at a temperature of 500° C. or higher was measured using a thermocouple attached to the outer periphery of the coil.

Each hot-rolled steel sheet thus obtained was then pickled under the conditions below, and was thereafter cold-rolled at a cold rolling ratio of 50%. The sheet thickness after cold rolling was 1.2 mm.

The pickling solution was 10% hydrochloric acid, the temperature was 82° C. and the pickling time as given in Table 2.

Next, annealing (oxidation, reduction) and cooling were performed in a continuous hot-dip galvanizing line under the conditions given in Table 2. The temperature of an oxidation furnace disposed in the continuous hot-dip galvanizing line was controlled to be 800° C., the hydrogen concentration in a reduction furnace was controlled to 20 vol %, with the balance being nitrogen and inevitable impurities, and the dew point was controlled to be −45° C. The keeping time at the soaking temperature given in Table 2 was set to be 50 seconds in all instances.

Thereafter, except for the following Nos. 10 and 11, dipping into a galvanizing bath at 460° C. was carried out, followed by cooling down to room temperature at an average cooling rate of 10° C./sec, thereby to obtain a hot-dip galvanized steel sheet (GI) (No. 23). With respect to hot-dip galvannealed steel sheets (GA), dipping into the above galvanizing bath was carried out to perform hot-dip galvanizing, followed by heating to 500° C. Then, after keeping at this temperature for 20 seconds to perform an alloying process, cooling down to room temperature at an average cooling rate of 10° C./sec was carried out (Nos. 1 to 9, 12 to 22, and 24 to 33).

In No. 10, after cooling down to a cooling stop temperature of 200° C. given in Table 2, heating to 460° C. was carried out, followed by dipping into a galvanizing bath, thereby to obtain a GA steel sheet in the same manner as shown above. Further, in No. 11, as shown in Table 2, after cooling down to 600° C. at an average cooling rate of 10° C./sec, WQ (water-quenching) was carried out, followed by heating to 460° C. and subsequent dipping into a galvanizing bath, thereby to obtain a GA steel sheet in the same manner as shown above.

The plated steel sheets, i.e. GI or GA, thus obtained were evaluated for the below-described characteristics. As described below, the average depth of the internal oxide layer was measured not only in each plated steel sheet, but was likewise measured, for reference, in the base steel sheet after pickling and cold rolling. The purpose of this is to confirm that the desired average depth of the internal oxide layer is obtained already in the cold-rolled steel sheet before annealing, through control of for instance the coiling temperature and pickling conditions after hot rolling.

Figure 2:
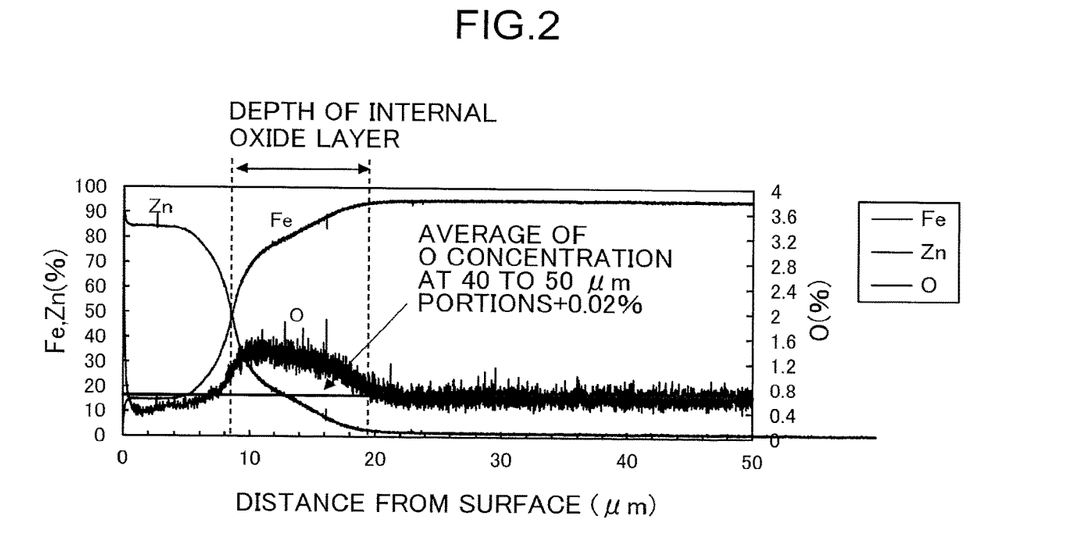
FIG. 2 is an explanatory diagram for measuring an average depth d of an internal oxide layer of the plated steel sheet of the present invention.

(1) Measurement of the Average Depth d of the Internal Oxide Layer of Plated Steel Sheets Taking as W the sheet width of each plated steel sheet, a test piece having a size of 50 mm×50 mm was sampled from a W/4 portion, and thereafter the O amount, Fe amount, and Zn amount from the plated layer surface were analyzed and quantified by GD-OES (Glow Discharge-Optical Emission Spectroscopy). In further detail, the surface of the test piece was high-frequency sputtered within an Ar glow discharge region, using a GD-OES device of GD-PROFILER 2 GDA 750, by HORIBA Ltd., and the respective emission lines of the sputtered elements O, Fe and Zn in the Ar plasma were resolved continuously, to measure as a result the respective element content profiles in the depth direction of the base steel sheet. The sputtering conditions were as described below, and the measurement region was set to extend to a depth of 50 µm from the plated layer surface.

(Sputtering Conditions)
Pulsed sputtering frequency: 50 Hz
Anode diameter (analysis surface area): 6 mm diameter
Discharge power: 30 W
Ar gas pressure: 2.5 hPa The results of the analysis are illustrated in FIG. 2. As illustrated in FIG. 2, the interface of the plated layer and the base steel sheet was set at the position from the plated layer surface at which the Zn amount and the Fe amount were equal. The average value of the O amount at each measurement position in a depth in the range of 40 to 50 µm from the plated layer surface was taken as the bulk O amount average value, and a range being 0.02% higher than that (i.e. O amount (bulk O amount average value+0.02%)) was defined as the internal oxide layer. The maximum depth of that range was taken as the depth of the internal oxide layer. the same test was performed using three test pieces, and the average of the foregoing was taken as the average depth d of the internal oxide layer.

(2) Measurement of the Internal Oxide Layer Depth after Pickling-Cold Rolling (Reference)

The average depth of the internal oxide layer was calculated in the same way as in (1), but using herein the base steel sheet after pickling-cold rolling.

(3) Measurement of the Average Depth D of the Soft Layer

Figure 3:
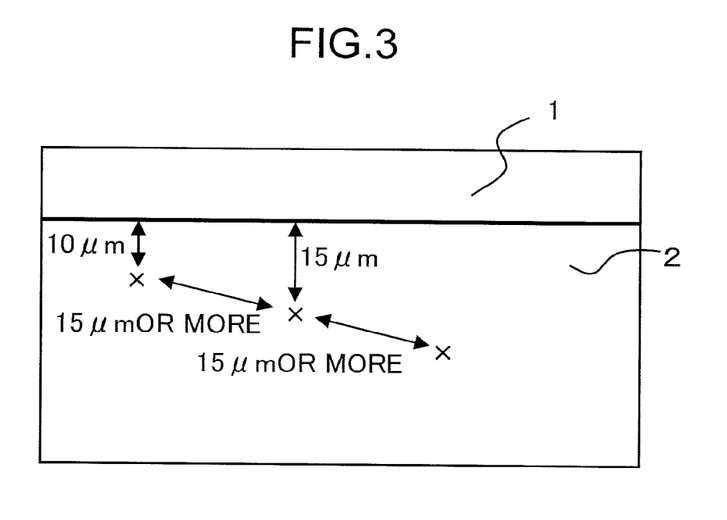
FIG. 3 is a diagram for explaining measurement positions of Vickers hardness, used to establish an average depth D of a soft layer.

A test piece having a size of 20 mm×20 mm was sampled from an exposed W/4 portion, being a cross-section perpendicular to the direction of the sheet width W of each plated steel sheet. Thereafter, the test piece was embedded in resin, and Vickers hardness was measured from the interface of the plated layer and the base steel sheet towards the interior of the base steel sheet at a sheet thickness t. The hardness was measured at a load of 3 gf using a Vickers hardness tester. In detail, measurements were performed at pitches of 5 µm inward in the sheet thickness, starting at a measurement position at a depth of 10 µm inward in the sheet thickness, from the interface of the plated layer and the base steel sheet, as illustrated in FIG. 3. The Vickers hardness was measured down to a depth of 100 µm. The spacing between measurement points; that is, the distance between x and x in FIG. 3, was set to be 15 µm or greater at the lowest. The Vickers hardness was measured by n=1 for each depth, to investigate the hardness distribution in the inward direction of the sheet thickness. The Vickers hardness at a portion t/4 of the base steel sheet was also measured (n=1) under a load of 1 kgf, using a Vickers hardness tester. A region having a Vickers hardness of 90% or less with respect to that of the portion t/4 of the base steel sheet was considered to be a soft layer, and the depth of this soft layer was calculated. The same process was carried out at 10 sites in one same test piece, and the average was taken as the average depth D of the soft layer.

(4) Method for Measuring the Structure Fraction of the Plated Steel Sheets

A W/4 portion, being a cross-section perpendicular to the direction of the sheet width W of the plated steel sheet, was exposed, and the cross-section was polished and then electropolished; thereafter, the cross-section was corroded with nital, and was observed by SEM (Scanning Electron Microscope). The observation position was set to a t/4 position, where t is the sheet thickness of the base steel sheet, the observation magnifications were set to 2000 times, and the observation region to 40 μm×40 μm. The metal structure micrographs captured by SEM were subjected to image analysis, to measure the respective area ratios of martensite and bainite (the two were not distinguished from each other), and ferrite. In Table 3, α=ferrite, and (B+M)=(bainite+martensite). In Table 3, the area fraction of the "Other" structure was calculated by subtracting the area ratios of martensite and bainite, and ferrite from 100 area %. The observations were carried out arbitrarily in three fields of view, and the average value of the foregoing was calculated.

(5) Method for Measuring the Average Grain Size of Prior Austenite in the Plated Steel Sheets A W/4 portion, being a cross-section perpendicular to the direction of the sheet width W of the plated steel sheet, was exposed, and the cross-section was polished and then etched with a mixture liquid of a saturated aqueous solution of picric acid and 0.5% sodium alkylsulfonate, so as to reveal the prior austenite grain boundary. Subsequently, the average grain size number G of the structure of a t/4 site was determined in accordance with the cutting method of JIS G 0551. In further detail, the magnification of an optical microscope was determined so that a test line intersected with at least 50 crystal grains in one field of view of the structure of the t/4 site, and the average grain size number G was determined by using at least 250 crystal grain numbers that intersected with the test line in at least 5 fields of view that were selected at random. The average crystal grain number m per 1 mm$^2$ of the cross-section was calculated from this average grain size number G, and the average grain size d (mm) of prior austenite was determined on the basis of the expression d (mm)=1/√m. In Table 3, "-" denotes an example in which prior austenite could not be observed, because the sum area ratio of bainite and martensite was small.

(6) Measurement Method in a Tensile Test

JIS 13B tensile test pieces were sampled in such a manner that the direction perpendicular to the rolling direction of the plated steel sheet and the longitudinal direction of the test pieces were parallel, and the tensile strength (TS) and yield stress (YS) in the C direction were measured in accordance with JIS 72241. The yield ratio YR (YS/TS) was calculated from TS and YS.

In the Examples, those test pieces having a tensile strength TS of 980 MPa or higher were rated as of high strength (acceptable). Those test pieces having YR of 60% or higher were rated as having excellent impact absorption properties (acceptable).

(7) Bending Work Test 20 mm×70 mm test pieces were cut out of the plated steel sheets in such a manner that the direction perpendicular to the rolling direction of the plated steel sheets and the longitudinal direction of the test pieces were parallel, and a 90° V-bending test was carried so that a bending ridge line coincided with the longitudinal direction. The test was performed by modifying the bending radius R as appropriate, and there was worked out the minimum bending radius Rmin that allowed for bending work without cracks occurring in the test pieces.

Bendability was evaluated for each tensile strength TS, on the basis of Rmin/t, which is the quotient of Rmin divided by the sheet thickness t of the base steel sheet. The details are as follows. Bendability was not evaluated (marked as "-" in Table 3) for test pieces in which TS did not satisfy the acceptance criteria being 980 MPa or higher.

Rmin/t<1.0 was deemed as acceptable when TS was 980 MPa or higher and lower than 1080 MPa.

Rmin/t<1.5 was deemed as acceptable when TS was 1080 MPa or higher and lower than 1180 MPa.

Rmin/t<2.50 was deemed as acceptable when TS was 1180 MPa or higher.

(8) Delayed Fracture Resistance Test

A W/4 portion, being a cross-section perpendicular to the direction of the sheet width W of each plated steel sheet, was exposed, and a 150 mm (W)×30 mm (L) test piece was cut out and was U-bent at a minimum bending radius; thereafter, the test piece was fastened with bolts, and the outer surface of the U-bent test piece was loaded with a tensile stress of 1000 MPa. To measure tensile stress, a strain gauge was affixed to the outside of the U-bent test piece, and strain was converted to tensile stress. Thereafter, the edges of the U-bent test piece were masked, and the test piece was electrochemically charged with hydrogen. Hydrogen charging was carried out herein through immersion in a mixed solution of 0.1M-$H_2SO_4$ (pH=3) and 0.01M-KSCN, under conditions of room temperature and constant current of 100 μA/mm$^2$.

In the results of the hydrogen charge test, instances with no cracking in 24 hours were rated as acceptable, i.e. of excellent delayed fracture resistance.

(9) Hole Expansion Test

A hole expansion test was carried out according to the Japan Iron and Steel Federation Standard JFS T 1001, to measure λ. In further detail, holes having a diameter of 10 mm were punched in the plated steel sheet; thereafter a 60° conical punch was pressed into the hole, with the periphery in a restrained state, and the diameter of the hole at the crack initiation limit was measured. A limit hole expansion ratio λ (%) was worked out on the basis of the expression below. Instances where λ was 25% or higher were rated as acceptable, i.e. of excellent hole expandability.

$$\text{Limit hole expansion ratio } \lambda(\%)=\{(Df-D0)/D0\}\times 100$$

In the expression, Df denotes the diameter (mm) of the hole at the crack initiation limit, and D0 denotes the diameter (mm) of the initial hole.

(10) Appearance of the Plated Steel Sheets

The appearance of the plated steel sheets was observed visually, and platability was evaluated on the basis of the occurrence or absence of bare spots.

The results are summarized in Table 2 and Table 3.

TABLE 1

| Steel No. | type | C | Si | Mn | P | S | Al | N | Cr | Mo | B | Ti | Nb | V | Cu | Ni | Ac$_3$ (° C.) |
|---|---|---|---|---|---|---|---|---|---|---|---|---|---|---|---|---|---|
| 1 | A | 0.13 | 0.82 | 2.45 | 0.011 | 0.002 | 0.041 | 0.0039 | | | | | | | | | 824 |
| 2 | B | 0.11 | 1.21 | 2.45 | 0.010 | 0.002 | 0.037 | 0.0038 | 0.30 | | | | | | | | 842 |
| 3 | C | 0.10 | 1.07 | 2.75 | 0.009 | 0.002 | 0.045 | 0.0035 | | 0.2 | | | | | | | 842 |
| 4 | D | 0.14 | 1.70 | 2.20 | 0.011 | 0.002 | 0.041 | 0.0037 | | | 0.0030 | | | | | | 868 |
| 5 | E | 0.08 | 1.24 | 2.20 | 0.010 | 0.002 | 0.038 | 0.0037 | | | | 0.07 | | | | | 892 |

TABLE 1-continued

| Steel | | Components (mass %) | | | | | | | | | | | | | | | Ac₃ |
|---|---|---|---|---|---|---|---|---|---|---|---|---|---|---|---|---|---|
| No. | type | C | Si | Mn | P | S | Al | N | Cr | Mo | B | Ti | Nb | V | Cu | Ni | (° C.) |
| 6 | F | 0.17 | 1.53 | 2.10 | 0.012 | 0.001 | 0.036 | 0.0038 | | | | | 0.10 | | | | 854 |
| 7 | G | 0.12 | 1.82 | 2.50 | 0.008 | 0.002 | 0.038 | 0.0035 | | | | | | 0.09 | | | 876 |
| 8 | H | 0.18 | 1.26 | 2.56 | 0.009 | 0.002 | 0.031 | 0.0031 | | | | | | | 0.15 | | 819 |
| 9 | I | 0.12 | 1.35 | 2.08 | 0.014 | 0.002 | 0.036 | 0.0038 | | | | | | | | 0.15 | 860 |
| 10 | J | 0.24 | 1.40 | 2.40 | 0.090 | 0.002 | 0.042 | 0.0051 | | | 0.0030 | | | | | | 881 |
| 11 | K | 0.17 | 1.35 | 2.05 | 0.011 | 0.002 | 0.044 | 0.0042 | | | 0.0030 | 0.02 | | | | | 858 |
| 12 | L | 0.26 | 1.10 | 2.10 | 0.011 | 0.002 | 0.042 | 0.0032 | | | | | | | | | 817 |
| 13 | M | 0.11 | 0.40 | 2.35 | 0.011 | 0.002 | 0.042 | 0.0032 | | | | | | | | | 815 |
| 14 | N | 0.10 | 1.80 | 1.80 | 0.015 | 0.002 | 0.041 | 0.0051 | 0.20 | | | 0.04 | | | | | 913 |
| 15 | P | 0.15 | 1.00 | 2.00 | 0.011 | 0.002 | 0.043 | 0.0036 | | | | | | | | | 841 |
| 16 | A | 0.13 | 0.82 | 2.45 | 0.011 | 0.002 | 0.041 | 0.0039 | | | | | | | | | 824 |
| 17 | A | 0.13 | 0.82 | 2.45 | 0.011 | 0.002 | 0.041 | 0.0039 | | | | | | | | | 824 |
| 18 | A | 0.13 | 0.82 | 2.45 | 0.011 | 0.002 | 0.041 | 0.0039 | | | | | | | | | 824 |
| 19 | A | 0.13 | 0.82 | 2.45 | 0.011 | 0.002 | 0.041 | 0.0039 | | | | | | | | | 824 |
| 20 | A | 0.13 | 0.82 | 2.45 | 0.011 | 0.002 | 0.041 | 0.0039 | | | | | | | | | 824 |
| 21 | A | 0.13 | 0.82 | 2.45 | 0.011 | 0.002 | 0.041 | 0.0039 | | | | | | | | | 824 |
| 22 | A | 0.13 | 0.82 | 2.45 | 0.011 | 0.002 | 0.041 | 0.0039 | | | | | | | | | 824 |
| 23 | A | 0.13 | 0.82 | 2.45 | 0.011 | 0.002 | 0.041 | 0.0039 | | | | | | | | | 824 |
| 24 | A | 0.13 | 0.82 | 2.45 | 0.011 | 0.002 | 0.041 | 0.0039 | | | | | | | | | 824 |
| 25 | A | 0.13 | 0.82 | 2.45 | 0.011 | 0.002 | 0.041 | 0.0039 | | | | | | | | | 824 |
| 26 | A | 0.13 | 0.82 | 2.45 | 0.011 | 0.002 | 0.041 | 0.0039 | | | | | | | | | 824 |
| 27 | A | 0.13 | 0.82 | 2.45 | 0.011 | 0.002 | 0.041 | 0.0039 | | | | | | | | | 824 |
| 28 | A | 0.13 | 0.82 | 2.45 | 0.011 | 0.002 | 0.041 | 0.0039 | | | | | | | | | 824 |
| 29 | A | 0.13 | 0.82 | 2.45 | 0.011 | 0.002 | 0.041 | 0.0039 | | | | | | | | | 824 |
| 30 | A | 0.13 | 0.82 | 2.45 | 0.011 | 0.002 | 0.041 | 0.0039 | | | | | | | | | 824 |
| 31 | A | 0.13 | 0.82 | 2.45 | 0.011 | 0.002 | 0.041 | 0.0039 | | | | | | | | | 824 |
| 32 | A | 0.13 | 0.82 | 2.45 | 0.011 | 0.002 | 0.041 | 0.0039 | | | | | | | | | 824 |
| 33 | Q | 0.13 | 1.43 | 2.45 | 0.012 | 0.001 | 0.037 | 0.0037 | 0.14 | | 0.0032 | 0.02 | | | | | 857 |

TABLE 2

| No. | Steel type | Coiling temperature after hot rolling (° C.) | Temperature keeping | Keeping time in a temperature region of 500° C. or higher (min) | Pickling time (sec) | Average depth of internal oxide layer after pickling-cold rolling (μm) | Oxidation furnace air ratio | Average heating rate (° C./sec) | Soaking Temperature (° C.) | Average cooling rate (° C./sec) | Cooling stop temperature (° C.) | Average depth d of internal oxide layer after plating (μm) | Depth D of soft layer after plating (μm) | D/2d |
|---|---|---|---|---|---|---|---|---|---|---|---|---|---|---|
| 1 | A | 660 | No | — | 45 | 10 | 1.1 | 9.6 | 900 | 10 | 450 | 11 | 24 | 1.09 |
| 2 | B | 660 | No | — | 45 | 12 | 1.1 | 7.7 | 900 | 10 | 450 | 12 | 26 | 1.08 |
| 3 | C | 660 | No | — | 45 | 11 | 1.1 | 7.7 | 900 | 10 | 450 | 11 | 22 | 1.00 |
| 4 | D | 660 | No | — | 45 | 13 | 1.1 | 6.2 | 900 | 10 | 450 | 13 | 30 | 1.15 |
| 5 | E | 660 | No | — | 45 | 11 | 1.1 | 5.3 | 900 | 10 | 450 | 12 | 32 | 1.33 |
| 6 | F | 660 | No | — | 45 | 9 | 1.1 | 6.9 | 900 | 10 | 450 | 11 | 28 | 1.27 |
| 7 | G | 660 | No | — | 45 | 12 | 1.1 | 5.8 | 900 | 10 | 450 | 12 | 28 | 1.17 |
| 8 | H | 660 | No | — | 45 | 11 | 1.1 | 10.4 | 900 | 10 | 450 | 11 | 26 | 1.18 |
| 9 | I | 660 | No | — | 45 | 13 | 1.1 | 6.6 | 900 | 10 | 450 | 14 | 24 | 0.86 |
| 10 | J | 660 | No | — | 45 | 12 | 1.1 | 5.6 | 900 | 10 | 200 | 13 | 30 | 1.15 |
| 11 | K | 660 | No | — | 45 | 11 | 1.1 | 6.6 | 900 | 10(*) | WQ | 11 | 24 | 1.09 |
| 12 | L | 660 | No | — | 45 | 13 | 1.1 | 10.7 | 900 | 10 | 450 | 14 | 36 | 1.29 |
| 13 | M | 660 | No | — | 45 | 2 | 1.1 | 11.2 | 900 | 10 | 450 | 3 | 20 | 3.33 |
| 14 | N | 660 | No | — | 45 | 13 | 1.1 | 5.7 | 925 | 10 | 450 | 14 | 34 | 1.21 |
| 15 | P | 660 | No | — | 45 | 10 | 1.1 | 7.8 | 900 | 4 | 450 | 11 | 26 | 1.18 |
| 16 | A | 580 | No | — | 45 | 2 | 1.1 | 9.6 | 900 | 10 | 450 | 3 | 17 | 2.83 |
| 17 | A | 590 | No | — | 45 | 3 | 1.1 | 9.6 | 900 | 10 | 450 | 3 | 18 | 3.00 |
| 18 | A | 720 | No | — | 45 | 15 | 1.1 | 9.6 | 900 | 10 | 450 | 16 | 40 | 1.25 |
| 19 | A | 660 | No | — | 45 | 10 | 1.1 | 9.6 | 900 | 10 | 450 | 10 | 12 | 0.60 |
| 20 | A | 660 | No | — | 45 | 10 | 0.8 | 9.6 | 900 | 10 | 450 | 11 | 20 | 0.91 |
| 21 | A | 660 | No | — | 45 | 10 | 0.9 | 9.6 | 800 | 10 | 450 | 11 | 24 | 1.09 |
| 22 | A | 660 | No | — | 45 | 10 | 1.1 | — | 900 | 2 | 450 | 11 | 25 | 1.14 |
| 23 | A | 660 | No | — | 45 | 10 | 1.1 | 9.6 | 900 | 10 | 450 | 11 | 24 | 1.09 |
| 24 | A | 620 | No | — | 45 | 7 | 1.1 | 9.6 | 900 | 10 | 450 | 8 | 22 | 1.38 |
| 25 | A | 470 | Yes | 180 | 45 | 1 | 1.1 | 9.6 | 900 | 10 | 450 | 1 | 16 | 8.00 |
| 26 | A | 570 | Yes | 180 | 45 | 12 | 1.1 | 9.6 | 900 | 10 | 450 | 13 | 32 | 1.23 |
| 27 | A | 570 | Yes | 60 | 45 | 3 | 1.1 | 9.6 | 900 | 10 | 450 | 3 | 18 | 3.00 |
| 28 | A | 660 | No | — | 45 | 11 | 1.1 | 1.0 | 900 | 10 | 450 | 12 | 26 | 1.08 |
| 29 | A | 660 | No | — | 45 | 10 | 1.1 | 2.0 | 900 | 10 | 450 | 11 | 27 | 1.23 |
| 30 | A | 660 | No | — | 45 | 10 | 1.1 | 4.0 | 900 | 10 | 450 | 11 | 25 | 1.14 |
| 31 | A | 660 | No | — | 45 | 10 | 1.1 | 15.0 | 900 | 10 | 450 | 11 | 26 | 1.18 |
| 32 | A | 570 | Yes | 180 | 45 | 13 | 1.1 | 1.0 | 900 | 10 | 450 | 14 | 33 | 1.18 |
| 33 | Q | 660 | No | — | 45 | 12 | 1.1 | 6.7 | 900 | 10 | 450 | 13 | 29 | 1.12 |

(*)Water-quenched after being cooled to 600° C. at 10° C./sec

TABLE 3

| Steel No. | Steel type | Prior γ average grain size (μm) | Hard layer structure (area %) α | Hard layer structure (area %) B + M | Hard layer structure (area %) Other | YS (MPa) | TS (MPa) | YR (%) | λ (%) | Bendability Rmin/t | Bendability Evaluation | Delayed fracture resistance | Bare spots | Type of plating |
|---|---|---|---|---|---|---|---|---|---|---|---|---|---|---|
| 1 | A | 12 | 0 | 99 | 1 | 834 | 1201 | 69 | 36 | 1.67 | Acceptable | Acceptable | No | GA |
| 2 | B | 11 | 0 | 100 | 0 | 910 | 1284 | 71 | 42 | 1.67 | Acceptable | Acceptable | No | GA |
| 3 | C | 9 | 0 | 99 | 1 | 830 | 1210 | 69 | 54 | 1.25 | Acceptable | Acceptable | No | GA |
| 4 | D | 13 | 0 | 98 | 2 | 871 | 1282 | 68 | 32 | 2.08 | Acceptable | Acceptable | No | GA |
| 5 | E | 8 | 4 | 93 | 3 | 632 | 981 | 64 | 29 | 0.42 | Acceptable | Acceptable | No | GA |
| 6 | F | 7 | 0 | 99 | 1 | 960 | 1321 | 73 | 31 | 2.08 | Acceptable | Acceptable | No | GA |
| 7 | G | 9 | 0 | 99 | 1 | 867 | 1312 | 66 | 39 | 1.67 | Acceptable | Acceptable | No | GA |
| 8 | H | 12 | 0 | 100 | 0 | 1032 | 1472 | 70 | 36 | 2.08 | Acceptable | Acceptable | No | GA |
| 9 | I | 12 | 3 | 95 | 2 | 735 | 1087 | 68 | 36 | 1.25 | Acceptable | Acceptable | No | GA |
| 10 | J | 12 | 0 | 96 | 4 | 1026 | 1245 | 82 | 43 | 1.25 | Acceptable | Acceptable | No | GA |
| 11 | K | 13 | 0 | 100 | 0 | 855 | 1032 | 83 | 65 | 0.42 | Acceptable | Acceptable | No | GA |
| 12 | L | 12 | 0 | 94 | 6 | 1105 | 1632 | 68 | 22 | 3.33 | Unacceptable | Unacceptable | No | GA |
| 13 | M | 12 | 0 | 100 | 0 | 646 | 1012 | 64 | 24 | 2.50 | Unacceptable | Unacceptable | No | GA |
| 14 | N | — | 35 | 62 | 3 | 557 | 963 | 58 | 23 | 0.83 | — | Acceptable | No | GA |
| 15 | P | — | 42 | 58 | 0 | 537 | 935 | 57 | 18 | 0.83 | — | Acceptable | No | GA |
| 16 | A | 10 | 0 | 99 | 1 | 840 | 1206 | 70 | 26 | 2.50 | Unacceptable | Unacceptable | Yes | GA |
| 17 | A | 10 | 0 | 99 | 1 | 839 | 1205 | 70 | 27 | 2.50 | Unacceptable | Unacceptable | Yes | GA |
| 18 | A | 13 | 0 | 99 | 1 | 829 | 1189 | 70 | 34 | 1.25 | Acceptable | Acceptable | No | GA |
| 19 | A | 12 | 0 | 99 | 1 | 840 | 1208 | 70 | 34 | 2.50 | Unacceptable | Unacceptable | Yes | GA |
| 20 | A | 12 | 0 | 99 | 1 | 841 | 1204 | 70 | 30 | 2.29 | Acceptable | Acceptable | No | GA |
| 21 | A | — | 20 | 77 | 3 | 655 | 1130 | 58 | 14 | 2.92 | Unacceptable | Unacceptable | No | GA |
| 22 | A | — | 15 | 83 | 2 | 674 | 1145 | 59 | 18 | 2.92 | Unacceptable | Unacceptable | No | GA |
| 23 | A | 12 | 0 | 99 | 1 | 830 | 1199 | 69 | 37 | 1.67 | Acceptable | Acceptable | No | GI |
| 24 | A | 11 | 0 | 99 | 1 | 840 | 1209 | 69 | 38 | 1.67 | Acceptable | Acceptable | No | GA |
| 25 | A | 10 | 0 | 100 | 0 | 832 | 1220 | 68 | 27 | 2.50 | Unacceptable | Unacceptable | Yes | GA |
| 26 | A | 14 | 0 | 99 | 1 | 813 | 1195 | 68 | 30 | 1.25 | Acceptable | Acceptable | No | GA |
| 27 | A | 11 | 0 | 99 | 1 | 830 | 1219 | 68 | 28 | 2.50 | Unacceptable | Unacceptable | Yes | GA |
| 28 | A | 26 | 0 | 99 | 1 | 779 | 1187 | 66 | 22 | 3.33 | Unacceptable | Unacceptable | No | GA |
| 29 | A | 22 | 0 | 99 | 1 | 802 | 1195 | 67 | 24 | 2.92 | Unacceptable | Unacceptable | No | GA |
| 30 | A | 16 | 0 | 99 | 1 | 812 | 1198 | 68 | 32 | 2.08 | Acceptable | Acceptable | No | GA |
| 31 | A | 10 | 0 | 99 | 1 | 853 | 1207 | 71 | 38 | 1.25 | Acceptable | Acceptable | No | GA |
| 32 | A | 27 | 0 | 99 | 1 | 789 | 1181 | 67 | 22 | 2.92 | Unacceptable | Unacceptable | No | GA |
| 33 | Q | 9 | 0 | 99 | 1 | 887 | 1286 | 69 | 43 | 1.67 | Acceptable | Acceptable | No | GA |

The following observations arise from the Tables.

Firstly, examples Nos. 1 to 11, 18, 20, 23, 24, 26, 30, 31, and 33 satisfied the requirements of the present invention, and all exhibited good strength, formability (bendability and hole expandability (λ)), delayed fracture resistance, impact properties, and platability. In particular, No. 1 (D/2d=1.09) in which the average depth d of the internal oxide layer and average depth D of the soft layer satisfied the relationship D>2d (i.e. value of "D/2d" greater than 1 in Table 2), exhibited better bendability than No. 20 (D/2d=0.91), which did not satisfy the above relationship. Further, λ as well was greater.

In contrast, in No. 12, being an example with a large amount of C, bendability, λ and delayed fracture resistance were low.

In No. 13, being an example where the amount of Si was small, the internal oxide layer failed to be generated sufficiently, and bendability, λ, and delayed fracture resistance were low.

In No. 14, being an example where the amount of Mn was small, hardenability was poor, and accordingly ferrite was generated excessively. Also, the sum amount of (B+M) was low. As a result, TS and YR were low, and λ as well was low.

In No. 15, being an example with a low average cooling rate after soaking, ferrite was generated excessively during cooling, and also the sum amount of (B+M) was low, so that the desired hard layer was not obtained. As a result, TS and YR were low, and λ was low.

In No. 22 also, being an example with a low average cooling rate after soaking, ferrite was generated excessively during cooling, so that YR was low, and λ, bendability, and delayed fracture resistance were low.

In Nos. 16 and 17, being examples in which the coiling temperature during hot rolling was low, the average depth of the internal oxide layer after pickling-cold rolling was shallow, and accordingly the average depth d of the internal oxide layer and the average depth D of the soft layer after galvanizing/galvannealing were shallow. As a result, bendability, delayed fracture resistance, and platability were low.

In No. 19, the air ratio in the oxidation furnace was low; the iron oxide film was not generated sufficiently; and platability was low. Further, the soft layer was not generated sufficiently. As a result, bendability and delayed fracture resistance as well were low.

In No. 21, being an example where the soaking temperature was low, there occurred biphasic region annealing and excessive generation of ferrite. Also, the sum amount of (B+M) was low, and the desired hard layer was not obtained. For this reason, YR was low, and λ, bendability, and delayed fracture resistance were low.

In No. 25, being an example in which the coiling temperature during hot rolling was low, the average depth of the internal oxide layer after pickling-cold rolling was shallow, and accordingly the average depth d of the internal oxide layer and the average depth D of the soft layer after galvanizing/galvannealing were shallow. As a result, bendability, delayed fracture resistance, and platability were low.

In No. 27, being an example of insufficient temperature keeping time, the average depth of the internal oxide layer after pickling-cold rolling was shallow, and accordingly the average depth d of the internal oxide layer and the average depth D of the soft layer after galvanizing/galvannealing were shallow. As a result, bendability, delayed fracture resistance, and platability were low.

In No. 28, being an example with a low average heating rate, the average grain size of prior austenite was large, and accordingly bendability, λ, and delayed fracture resistance were low.

In No. 29, being an example with a low average heating rate, the average grain size of prior austenite was large, and accordingly bendability, λ, and delayed fracture resistance were low.

In No. 32, being an example with a low average heating rate, the average grain size of prior austenite was large, and accordingly bendability, λ, and delayed fracture resistance were low.

REFERENCE SIGNS 1 plated layer
2 base steel sheet
3 internal oxide layer
4 soft layer
5 hard layer

The invention claimed is:

1. A high-strength plated steel sheet having a hot-dip galvanized layer or a hot-dip galvannealed layer on a surface of a base steel sheet, wherein:
(1) the base steel sheet comprises, in mass %,
C: 0.05 to 0.25%;
Si: 0.5 to 2.5%;
Mn: 2.0 to 4%;
P: more than 0% to 0.1% or less;
S: more than 0% to 0.05% or less;
Al: 0.01 to 0.1%; and
N: more than 0% to 0.01% or less; and
(2) the high-strength plated steel sheet sequentially has, from an interface of the base steel sheet and the hot-dip galvanized layer or galvannealed layer, towards the base steel sheet:
an internal oxide layer comprising at least one oxide selected from the group consisting of Si and Mn;
a soft layer including the internal oxide layer and having a Vickers hardness, measured under a load of 3 gf, of 90% or less of a Vickers hardness at a portion t/4 of the base steel sheet, measured under a load of 1 kgf, where t is a sheet thickness of the base steel sheet; and
a hard layer comprising a structure which is mainly composed of martensite and bainite and in which the average grain size of prior austenite is 20 μm or less, wherein the high-strength plated steel sheet satisfies:
an average depth D of the soft layer being 20 μm or greater; and
an average depth d of the internal oxide layer being 4 μm or greater and smaller than the D; and
a tensile strength being 980 MPa or higher.

2. The high-strength plated steel sheet according to claim 1, wherein the base steel sheet further comprises, in mass %, at least one of (a) to (c) below:

(a) at least one selected from the group consisting of Cr: more than 0% to 1% or less, Mo: more than 0% to 1% or less and B: more than 0% to 0.01% or less;
(b) at least one selected from the group consisting of Ti: more than 0% to 0.2% or less, Nb: more than 0% to 0.2% or less and V: more than 0% to 0.2% or less; and
(c) at least one selected from the group consisting of Cu: more than 0% to 1% or less and Ni: more than 0% to 1% or less.

3. The high-strength plated steel sheet according to claim 2, wherein the average depth d of the internal oxide layer and the average depth D of the soft layer satisfy the relationship D>2d.

4. The high-strength plated steel sheet according to claim 1, wherein the average depth d of the internal oxide layer and the average depth D of the soft layer satisfy the relationship D>2d.

5. A method for producing the high-strength plated steel sheet of claim 1, the method comprising, in order:
a hot rolling step of coiling, at a temperature of 600° C. or higher, a steel sheet having the steel components of the said base steel sheet;
a step of pickling and cold rolling the steel sheet such that there remain the internal oxide layer with the average depth d of 4 μm or more;
a step of oxidizing the steel sheet at an air ratio in a range of 0.9 to 1.4 in an oxidation zone;
a step of soaking the steel sheet within a range of $Ac_3$ point to $Ac_3$ point+100° C., in a reduction zone; and
a step of, after the soaking, cooling at an average cooling rate of 5° C./sec or higher over a range down to a cooling stop temperature,
wherein the steel sheet is heated at an average rate of 3° C./sec or higher from 500° C. to the $Ac_3$ point.

6. A method for producing the high-strength plated steel sheet of claim 1, the method comprising, in order:
a hot rolling step of coiling, at a temperature of 500° C. or higher, a steel sheet having the steel components of the said base steel sheet;
a step of keeping the steel sheet in a temperature region of 500° C. or higher for 80 minutes or longer;
a step of pickling and cold rolling the steel sheet such that there remain the internal oxide layer with the average depth d of 4 μm or more;
a step of oxidizing the steel sheet at an air ratio in the range of 0.9 to 1.4 in an oxidation zone;
a step of soaking the steel sheet within a range of $Ac_3$ point to $Ac_3$ point+100° C., in a reduction zone; and
a step of, after soaking, cooling the steel sheet at an average cooling rate of 5° C./sec or higher over a range down to a cooling stop temperature,
wherein the steel sheet is heated at an average rate of 3° C./sec or higher from 500° C. to the $Ac_3$ point.

* * * * *